United States Patent
Chang et al.

(10) Patent No.: US 6,712,878 B2
(45) Date of Patent: Mar. 30, 2004

(54) METHOD AND APPARATUS FOR RENEWABLE MERCURY SORPTION

(75) Inventors: Ramsay Chang, Los Altos, CA (US); Sharon Sjostrom, Denver, CO (US)

(73) Assignee: Electric Power Research Institute, Inc., Palo Alto, CA (US)

( * ) Notice: Subject to any disclaimer, the term of this patent is extended or adjusted under 35 U.S.C. 154(b) by 0 days.

(21) Appl. No.: 10/052,421

(22) Filed: Jan. 17, 2002

(65) Prior Publication Data

US 2002/0124725 A1 Sep. 12, 2002

Related U.S. Application Data

(60) Provisional application No. 60/263,116, filed on Jan. 18, 2001.

(51) Int. Cl.[7] .............................................. B01D 53/04
(52) U.S. Cl. ............................... 95/90; 95/107; 95/134; 95/148; 96/151; 96/154
(58) Field of Search ............................ 95/90, 107, 134, 95/148; 96/108, 143, 150, 151, 154

(56) References Cited

U.S. PATENT DOCUMENTS

| | | | |
|---|---|---|---|
| 2,215,323 A | | 9/1940 | Guthrie |
| 2,545,850 A | * | 3/1951 | Imhoff ........................ 95/112 |
| 3,541,025 A | | 11/1970 | Takashi Oda et al. |
| 3,608,273 A | | 9/1971 | Fabuss et al. |
| 3,693,323 A | | 9/1972 | Gant |
| 3,793,806 A | | 2/1974 | Fornoff |
| 3,951,856 A | | 4/1976 | Repik et al. |
| 4,045,368 A | | 8/1977 | Katori et al. |
| 4,147,523 A | * | 4/1979 | Izumo ........................ 96/126 |
| 4,239,827 A | * | 12/1980 | Notaro ........................ 428/35 |
| 4,419,107 A | | 12/1983 | Roydhouse |
| 4,491,609 A | | 1/1985 | Degel et al. |
| 4,500,327 A | | 2/1985 | Nishino et al. |
| 4,617,035 A | | 10/1986 | Wakaizumi et al. |
| 4,690,914 A | | 9/1987 | Callut et al. |
| 4,691,534 A | * | 9/1987 | Lombardini et al. ......... 62/55.5 |
| 4,883,499 A | | 11/1989 | Beierle et al. |
| 4,889,698 A | | 12/1989 | Moller et al. |
| 4,921,826 A | | 5/1990 | Juntgen et al. |
| 4,921,831 A | | 5/1990 | Nakai et al. |
| 4,987,115 A | | 1/1991 | Michel-Kim |
| 5,000,007 A | * | 3/1991 | Haefner ...................... 62/55.5 |

(List continued on next page.)

FOREIGN PATENT DOCUMENTS

DE      29 32 274 A1     8/1979

OTHER PUBLICATIONS

Chang et al., Pilot Scale Evaluation of Carbon Compound Additives for the Removal of Trace Metals at Coal–Fired Utility Power Plantsl,: *Second International Conference on Managing Hazardous Air Pollutants*, Jul. 1993, pp. VI–41 to VI–57.

(List continued on next page.)

*Primary Examiner*—Frank M. Lawrence
(74) *Attorney, Agent, or Firm*—Morgan, Lewis & Bockius LLP

(57) ABSTRACT

A method of removing trace contaminants, such as mercury, from a flue gas by passing the gas over a sorbent structure on which is coated a renewable layer of sorbent. The sorbent structure can be a tube or plate and can be porous or non-porous and is placed inside a duct through which the flue gas flows. The sorbent particles comprise noble metal or activated carbon particles and can be injected into the gas stream before it passes over the sorbent structures. The sorbent structures can be periodically recoated with sorbent while the gas is still flowing.

28 Claims, 1 Drawing Sheet

U.S. PATENT DOCUMENTS

| | | | |
|---|---|---|---|
| 5,064,805 A | | 11/1991 | Otowa |
| 5,089,030 A | | 2/1992 | Michel-Kim |
| 5,124,292 A | | 6/1992 | Larsen et al. |
| 5,141,724 A | | 8/1992 | Audeh et al. |
| 5,164,355 A | | 11/1992 | Farris et al. |
| 5,187,141 A | | 2/1993 | Jha et al. |
| 5,287,383 A | | 2/1994 | Hirai |
| 5,304,527 A | | 4/1994 | Dimitri |
| 5,306,675 A | | 4/1994 | Wu et al. |
| 5,312,599 A | | 5/1994 | Schwartz, Jr. |
| 5,336,300 A | * | 8/1994 | Yoshino et al. ............... 95/96 |
| 5,352,370 A | | 10/1994 | Hayden |
| 5,352,647 A | | 10/1994 | Suchenwirth |
| 5,354,363 A | | 10/1994 | Brown, Jr. et al. |
| 5,364,821 A | | 11/1994 | Holland |
| 5,370,720 A | | 12/1994 | Duncan |
| 5,406,006 A | | 4/1995 | Hill et al. |
| 5,409,522 A | | 4/1995 | Durham et al. |
| 5,419,884 A | | 5/1995 | Weekman et al. |
| 5,438,029 A | | 8/1995 | Kobata et al. |
| 5,444,031 A | | 8/1995 | Hayden |
| 5,505,766 A | * | 4/1996 | Chang ..................... 95/134 |
| 5,538,932 A | | 7/1996 | Yan et al. |
| 5,569,436 A | | 10/1996 | Lerner |
| 5,575,982 A | | 11/1996 | Reiss et al. |
| 5,628,819 A | | 5/1997 | Mestemaker et al. |
| 5,672,323 A | | 9/1997 | Bhat et al. |
| 5,733,515 A | | 3/1998 | Doughty et al. |
| 5,814,129 A | * | 9/1998 | Tentarelli ..................... 95/90 |
| 5,827,352 A | * | 10/1998 | Altman et al. ............... 95/58 |
| 5,854,173 A | * | 12/1998 | Chang et al. ............... 502/417 |
| 5,948,143 A | * | 9/1999 | Sjostrom et al. ............... 95/134 |
| 6,103,205 A | | 8/2000 | Wojtowicz et al. |
| 6,136,072 A | | 10/2000 | Sjostrom et al. |
| 6,451,094 B1 | * | 9/2002 | Chang et al. ............... 95/901 |
| 6,521,021 B1 | * | 2/2003 | Pennline et al. ............... 95/134 |

OTHER PUBLICATIONS

"Activated Carbon," *Kirk–Othmer Encyclopedia of Chemical Technology* $4^{th}$. Ed., vol. 4, 1992, pp. 1015–1037.

U.S. patent application Ser. No. 09/259,671 to Chang, et al., filed Mar. 26, 1999, entitled "Apparatus and Method for Removal of Vapor Phase Contaminants from a Gas Stream by In–Situ Activation of Carbon–Based Sorbents".

U.S. patent application Ser. No. 10/124,000 to Chang, et al., filed Apr. 16, 2002, entitled "Method and Apparatus for Removing Vapor Phase Contaminants from a Flue Gas Stream".

U.S. patent application Ser. No. 09/795,343 to Chang, et al. filed Feb. 27, 2002, entitled "Apparatus and Method for Decreasing Contaminants Present in Gas Stream".

* cited by examiner

METHOD AND APPARATUS FOR RENEWABLE MERCURY SORPTION

This application claims the benefit of U.S. Provisional Application No. 60/263,116 filed Jan. 18, 2001.

BACKGROUND OF THE INVENTION

1. Field of the Invention

The present invention relates to the area of air toxics control and particularly to the area of removing trace metals from flue gases.

2. Description of Related Art

The emission of trace metals from utility power plants is an important issue in light of the 1990 Clean Air Act Amendment (CAAA) on air toxics (Title III). Special attention has been given to mercury (Hg) in terms of its environmental release and impacts, and the Environmental Protection Agency (EPA) is closely scrutinizing sources that emit mercury. Mercury is present in flue gas in very low concentrations (<1 ppm) and forms a number of volatile compounds that are difficult to remove. Specially designed and costly emissions-control systems are required to capture these trace amounts of volatile compounds effectively.

Several approaches have previously been adopted for removing mercury from gas streams. These techniques include passing the gas stream through a fixed or fluidized sorbent bed or structure or using a wet scrubbing system. The most common methods are often called "fixed bed" techniques. Approaches using fixed bed technologies normally pass the mercury containing gas through a bed consisting of sorbent particles or various structures such as honeycombs, screens, and fibers coated with sorbents. Common sorbents include activated carbon and noble metals such as gold and silver. In many cases where noble metals are used, only the surface layer of the sorbent structure is coated with the noble metal sorbent while the support underneath is made of ceramic or metallic materials. The sorbents in these fixed structures can be periodically regenerated by heating the structure and driving off the adsorbed mercury (see, for example, U.S. Pat. No. 5,409,522, which is incorporated herein by reference). The mercury driven off can be recovered or removed separately.

There are, however, several disadvantages of fixed bed systems. Gas streams such as those from power plant coal combustion contain significant fly ash that can plug the bed structures and, thus, the beds need to be removed frequently from operation for cleaning. Alternatively, these beds may be located downstream of a separate particulate collector (see, for example, U.S. Pat. No. 5,409,522, which is incorporated herein by reference). Particulate removal devices ensure that components of the flue gas such as fly ash are removed before the gas passes over the mercury removal device. The beds will also have to be taken off-line periodically for regeneration, thereby necessitating a second bed to remain on-line while the first one is regenerating. These beds also require significant space and are very difficult to retrofit into existing systems such as into the ductwork of power-plants without major modifications.

In one technique, a removable filter bag is coated with sorbent and placed in a baghouse downstream of a particulate control device (see, for example, U.S. Pat. No. 5,505,766, which is incorporated herein by reference).

In another technique, a porous tube of sorbent material is placed into the duct work through which the gas passes (see, for example, U.S. Pat. No. 5,948,143, which is incorporated herein by reference). Such a technique permits the tube of sorbent materials to be cleaned and the sorbent to be regenerated in place without having to stop the gas flow by heating the sorbent in situ and driving off the contaminants. However, application of heat to the porous tube while it is in the duct is not a convenient technique.

Therefore, a need remains for a cost-effective way of employing sorbents in the removal of trace contaminants from gas streams so that the sorbents can be renewed without heating and in a manner that causes minimum disruption of the gas flow.

SUMMARY OF THE INVENTION

Accordingly, the present invention involves the use of a sorbent structure that can be coated and recoated with sorbent without disrupting gas flow. Specifically, in one embodiment, the present invention provides a method for removing a vapor-phase contaminant from a contaminated gas stream in a duct, the method comprising: adsorbing fresh sorbent onto the surface of a sorbent structure positioned inside the duct; passing the contaminated gas stream over the fresh sorbent structure so that a vapor-phase contaminant is adsorbed by the fresh sorbent until saturated sorbent is produced; periodically removing the saturated sorbent from the sorbent structure and collecting the saturated sorbent outside of the duct; and repeating the adsorbing step with a new quantity of fresh sorbent. A preferred embodiment of the method of the present invention additionally comprises adsorbing the sorbent onto the sorbent structure by injecting the fresh sorbent into the contaminated gas stream prior to passing the contaminated gas stream over the sorbent structure. In an alternate embodiment of the method of the present invention, adsorbing the sorbent on to the sorbent structure is carried out prior to placing the sorbent structure inside the duct. In a particularly preferred embodiment of the method of the present invention, the vapor-phase contaminant comprises mercury and/or at least one substance containing mercury.

The present invention additionally involves an apparatus for removing a vapor-phase contaminant from a contaminated gas stream in a duct. In one embodiment, the apparatus comprises at least one sorbent structure; a means for adsorbing fresh sorbent onto the sorbent structure; a means for passing the contaminated gas over the sorbent structure to produce saturated sorbent; and a means for removing and collecting the saturated sorbent.

A preferred embodiment of the present invention involves injecting sorbents into the gas stream upstream of a particulate collection device and coating sorbent structures with the sorbents in such a way that the coating can be removed and reapplied without disrupting the gas flow.

DESCRIPTION OF THE PREFERRED EMBODIMENTS

Figure 1:
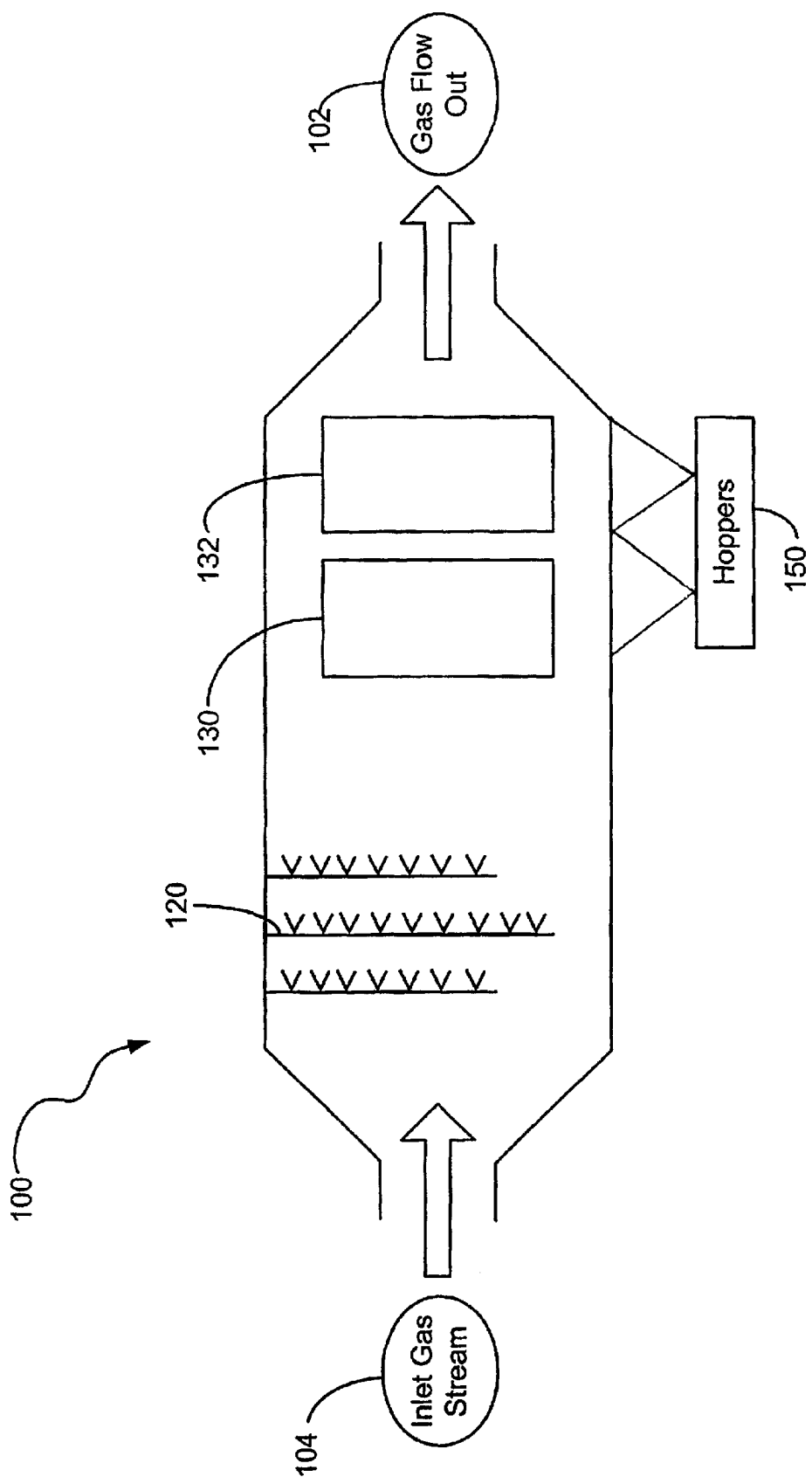
FIG. 1 is a block diagram of the apparatus of the present invention.

The present invention circumvents certain of the potential problems associated with fixed bed mercury adsorption systems. The basic concept is illustrated in FIG. 1, in which apparatus 100 comprises a representative piece of ductwork through which gas flows and inside of which are placed devices for removing trace components of mercury from the gas as it passes through. Inlet gas stream in 104 flows past sorbent injection elements 120, then past sorbent structures 130 and 132 where vapor phase contaminants such as trace mercury are removed from the gas 104. Outlet gas stream 102 is substantially free of trace mercury. Hoppers 150 can be used to collect sorbent that has adsorbed mercury. Sorbent may be introduced via sorbent injection elements 120. This sorbent may be fed to sorbent injection element 120 through a duct (not shown).

Instead of having permanent sorbent beds or sorbent structures located in the gas stream to collect mercury, the method of the present invention provides for an easily applied and easily removable sorbent coating so that sorbents can be readily applied and removed on line without the necessity of shutting down the gas flow in order to remove the sorbent beds.

In one embodiment of the method of the present invention, sorbent structures 130, 132 generally comprise structures coated with mercury sorbents such as noble metal or activated carbon particles on the surface. Sorbent structures may include any solid material that has a surface to which sorbents can attach. Examples of sorbent structures include, but are not limited to, tubes, plates, monoliths, walls, or vanes. The sorbent structures can be porous or non-porous. The sorbent structures are placed into the ductwork that transports the flue gas and can be located anywhere in the duct where mercury removal can be optimized, including at the stack or downstream of the air preheater. Mercury present in the flue gas is adsorbed on the surface of the sorbent structure, i.e., the tube, plate, or other structure as the flue gas passes over the surfaces that are coated with sorbents. In one embodiment, the flue gas passes over the sorbent structure such that at least a portion of the gas stream passes from a fluid inlet of the duct to a fluid outlet of the duct without passing through the sorbent structure. As the sorbents on the surfaces get saturated, they are removed, for example, to a hopper, and a new layer is coated back on. The mercury adsorbed on the spent sorbent is disposed of or recovered.

Several methods of coating and recoating sorbents on structures are described hereinbelow, including, but not limited to, applying the coating in-situ to the sorbent structures. Sorbent particles can be injected into the gas stream before it passes over the sorbent structures whereupon the sorbent particles are attracted to the surface. Attractive forces can be electrostatic, magnetic, gravitational, van der Waals, flow, others, or any combination of these. Examples of practical configurations can include, but are not limited to, injection before electrostatic precipitator plates where the sorbents will be driven to the surface by the electric field; injection of magnetic sorbents (carbon or gold coated on iron particles) before magnetized plates; triboelectrically charging the sorbents so they will be naturally attracted to the surfaces; and injecting the sorbents before porous structures where a steady stream of gas is pulled through the structure surface to attract and hold the sorbents. Sorbents can also be precoated on the sorbent structures before they are inserted into the gas stream.

Periodic removal of the saturated sorbents from the sorbent structures can be achieved by rapping the structure; demagnetization or elimination of the electrostatic forces; stopping flow through a porous structure and blowing back; and removing the structure and recoating off-line. The spent sorbents that are removed can be collected in a hopper and regenerated or disposed of. As is well known in the art, regeneration can be achieved by heating of the separately collected spent sorbents to drive off the mercury and then condensing the mercury.

Following removal of the saturated sorbent layer, another layer can be introduced on the surface of the sorbent structure by injection of sorbent particles upstream or by physically recoating the surface. By periodically depositing and removing sorbent particles from the structure surface, steady mercury removal from the gas stream can be achieved.

Various embodiments of the invention have been described. The descriptions are intended to be illustrative of the present invention. It will be apparent to one of skill in the art that modifications may be made to the invention as described without departing from the scope of the claims set out below. For example, it is to be understood that although the invention has been described in the context of mercury removal, it should be appreciated that other gas phase contaminants may be removed using the same method and apparatus, except that an appropriate sorbent must be selected for the contaminant to be removed.

What is claimed is:

1. A method for removing a vapor phase contaminant from a contaminated gas stream in a duct, said method comprising:

coating fresh sorbent onto a surface of a sorbent structure positioned inside a gas duct;

passing a contaminated gas stream comprising a vapor-phase contaminant through said gas duct and over said surface of said sorbent structure having said fresh sorbent thereon, without passing said contaminated gas stream through said sorbent structure, so that said vapor phase contaminant is adsorbed by said fresh sorbent until saturated sorbent is produced;

periodically removing said saturated sorbent from said sorbent structure and collecting said saturated sorbent outside of said gas duct; and repeating said coating with a new quantity of fresh sorbent.

2. The method of claim 1 wherein said adsorbing additionally comprises:

injecting said fresh sorbent into said contaminated gas stream prior to said passing.

3. The method of claim 1 wherein said coating is carried out prior to placing said sorbent structure inside said gas duct.

4. The method of claim 1 wherein said vapor-phase contaminant comprises at least one substance containing mercury.

5. An apparatus for removing a vapor phase contaminant from a contaminated gas stream in a duct, said apparatus comprising:

at least one sorbent structure;

a means for coating fresh sorbent onto said sorbent structure;

a means for passing a contaminated gas over said sorbent structure having said fresh sorbent thereon to produce saturated sorbent without passing said contaminated gas stream through said sorbent structure; and a means for removing and collecting said saturated sorbent.

6. A method for removing a vapor-phase contaminant from a gas stream, comprising:

coating a non-porous sorbent structure positioned in a gas duct with a sorbent;

passing a gas stream comprising a vapor-phase contaminant through the gas duct;

contacting the vapor-phase contaminant with the sorbent, thereby adsorbing the vapor-phase contaminant onto the sorbent;

removing the sorbent having the adsorbed vapor-phase contaminant from the gas duct; and recoating the non-porous sorbent structure with fresh sorbent.

7. The method of claim 6, wherein the coating comprises attracting the sorbent to the non-porous sorbent structure using an attractive force.

8. The method of claim 7, wherein the attracting comprises attracting the sorbent to the non-porous sorbent structure using an attractive force selected from the group consisting of electrostatic attraction, magnetic attraction, gravitational attraction, van der Waals attraction, and combinations thereof.

9. The method of claim 6, wherein the coating comprises magnetically attracting the sorbent to the non-porous sorbent structure.

10. The method of claim 9, wherein the removing comprises demagnetizing the sorbent and the sorbent structure.

11. The method of claim 6, wherein the non-porous sorbent structure is selected from the group consisting of tubes, plates, monoliths, walls, vanes and combinations thereof.

12. The method of claim 6, wherein the vapor-phase contaminant comprises mercury.

13. The method of claim 6, wherein the recoating comprises attracting the fresh sorbent to the non-porous sorbent structure using an attractive force selected from the group consisting of electrostatic attraction, magnetic attraction, gravitational attraction, van der Waals attraction, and combinations thereof.

14. The method of claim 6, wherein the recoating comprises:

removing the non-porous sorbent structure from the gas duct;

applying the fresh sorbent to the non-porous sorbent structure; and repositioning the non-porous sorbent structure in the gas duct.

15. The method of claim 6, wherein the recoating comprises recoating the non-porous sorbent structure with the fresh sorbent while the non-porous sorbent structure remains in the gas duct.

16. A method for removing a vapor-phase contaminant from a gas stream, comprising:

coating a sorbent structure positioned in a gas duct with a sorbent, wherein the coating comprises magnetically attracting the sorbent to the sorbent structure;

passing a gas stream comprising a vapor-phase contaminant through the gas duct;

contacting the vapor-phase contaminant with the sorbent, thereby adsorbing the vapor-phase contaminant onto the sorbent;

removing the sorbent having the adsorbed vapor-phase contaminant from the gas duct; and repeating the coating with fresh sorbent.

17. An apparatus for removing a vapor-phase contaminant from a gas stream, comprising:

a gas duct;

a magnetized sorbent structure positioned in said gas duct; and a sorbent attached to said magnetized sorbent structure, wherein said magnetized sorbent structure is configured to be periodically demagnetized, thereby allowing said sorbent to become detached from said magnetized sorbent structure.

18. A method for removing a vapor-phase contaminant from a gas stream, comprising:

passing a gas stream comprising a vapor-phase contaminant through a gas duct having a fluid inlet and a fluid outlet and having a sorbent structure comprising a sorbent disposed within the gas duct between the fluid inlet and the fluid outlet, wherein at least a portion of the gas stream passes from the fluid inlet to the fluid outlet without passing through the sorbent structure;

contacting the vapor-phase contaminant with the sorbent, whereby the vapor phase contaminant is adsorbed by the sorbent to produce saturated sorbent;

periodically removing the saturated sorbent from the sorbent structure; and coating the sorbent structure with fresh sorbent.

19. The method of claim 18, wherein the sorbent structure is selected from the group consisting of tubes, plates, monoliths, walls, vanes and combinations thereof.

20. The method of claim 18, wherein the vapor-phase contaminant comprises mercury.

21. The method of claim 18, wherein said coating comprises attracting the sorbent to the sorbent structure using an attractive force.

22. The method of claim 21, wherein said attracting comprises attracting the sorbent to the sorbent structure using an attractive force selected from the group consisting of electrostatic attraction, magnetic attraction, gravitational attraction, van der Waals attraction, and combinations thereof.

23. The method of claim 18, wherein said coating comprises magnetically attracting the sorbent to the sorbent structure.

24. The method of claim 23, wherein said periodically removing comprises demagnetizing the sorbent and the sorbent structure.

25. The method of claim 18, wherein said coating comprises:

removing the sorbent structure from the gas duct;

applying the fresh sorbent to the sorbent structure; and repositioning the sorbent structure in the gas duct.

26. The method of claim 18, wherein said coating comprises coating the sorbent structure with the fresh sorbent while the sorbent structure remains in the gas duct.

27. The method of claim 26, wherein said coating comprises injecting the fresh sorbent into the gas duct upstream of the sorbent structure.

28. An apparatus for removing a vapor-phase contaminant from a gas stream, comprising:

a gas duct having a fluid inlet and a fluid outlet;

a sorbent structure comprising a sorbent disposed within the gas duct between the fluid inlet and the fluid outlet, wherein at least a portion of a gas stream may pass from the fluid inlet to the fluid outlet without passing through the sorbent structure;

means for injecting fresh sorbent upstream of the sorbent structure attached to the gas duct; and means for periodically removing saturated sorbent from the sorbent structure.

* * * * *